(12) United States Patent
Reimann et al.

(10) Patent No.: US 10,834,020 B1
(45) Date of Patent: Nov. 10, 2020

(54) SCALABLE NETWORK OVERHEAD FOR CONTESTED ENVIRONMENTS

(71) Applicant: L3 Technologies, Inc., New York, NY (US)

(72) Inventors: Matthew J. Reimann, Draper, UT (US); Thomas R. Giallorenzi, Sandy, UT (US); Brent Kenney, Bountiful, UT (US); Chad S. Komer, Tooele, UT (US); Brian Thorp, Sandy, UT (US); Philip M. Hirz, Holladay, UT (US); Jason Wilden, South Jordan, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 16/408,167

(22) Filed: May 9, 2019

(51) Int. Cl.
| | |
|---|---|
| *H04L 12/927* | (2013.01) |
| *H04L 12/26* | (2006.01) |
| *H04W 28/02* | (2009.01) |
| *H04L 12/815* | (2013.01) |
| *H04L 12/851* | (2013.01) |
| *H04W 72/04* | (2009.01) |

(52) U.S. Cl.
CPC ........ *H04L 47/801* (2013.01); *H04L 43/0894* (2013.01); *H04L 47/22* (2013.01); *H04L 47/24* (2013.01); *H04W 28/0231* (2013.01); *H04W 28/0247* (2013.01); *H04W 28/0289* (2013.01); *H04W 72/0486* (2013.01); *H04W 72/0493* (2013.01)

(58) Field of Classification Search
None
See application file for complete search history.

(56) References Cited

U.S. PATENT DOCUMENTS

| | | | | |
|---|---|---|---|---|
| 2002/0181609 | A1* | 12/2002 | Tzannes | H04L 1/0002 375/295 |
| 2010/0290393 | A1* | 11/2010 | Matsushita | H04L 45/00 370/328 |
| 2013/0010695 | A1 | 1/2013 | So et al. | |

(Continued)

OTHER PUBLICATIONS

European Search Report and Search Opinion Received for EP Application No. 20156765.8, dated Jun. 26, 2020, 9 pages.

(Continued)

*Primary Examiner* — Jutai Kao
(74) *Attorney, Agent, or Firm* — Workman Nydegger

(57) ABSTRACT

Sending network data. A method includes transmitting data on a communication link, in an environment. A network control overhead portion of the data is allocated to network control overhead data packets for controlling how data is transmitted on the communication link. A user data portion of the data is allocated to user data packets for transmitting data between users of nodes on the communication link. A change in data capacity of the communication link is identified. As a result, a change is made in the network control overhead portion of the data, changing at least one of frequency of network control overhead data packets or size of network control overhead data packets to attempt to maintain a predetermined proportion factor for the network control overhead portion as compared to the user data portion. The network control overhead portion of the data is transmitted according to the change.

21 Claims, 4 Drawing Sheets

(56) References Cited

U.S. PATENT DOCUMENTS

| | | |
|---|---|---|
| 2015/0156129 A1 | 6/2015 | Tsuruoka |
| 2017/0070895 A1* | 3/2017 | Zhang ............... H04W 72/0493 |
| 2018/0102930 A1* | 4/2018 | Wang .................... H04L 5/0092 |
| 2019/0149474 A1* | 5/2019 | Iyer ..................... H04L 43/0876 |
| | | 370/230.1 |

OTHER PUBLICATIONS

Milanovic et al., "Routing and Securty in Mobile Ad Hoc Networks", IEEE Computer Society, Feb. 1, 2004, pp. 61-65.

\* cited by examiner

SCALABLE NETWORK OVERHEAD FOR CONTESTED ENVIRONMENTS

BACKGROUND

Background and Relevant Art

Computer systems often communicate with each other through networking. Wireless networking includes sending messages in a particular environment. The ability to send messages within an environment is often affected by various factors such as noise existing in the environment, weather conditions, cosmic and other radiation, physical barriers, distance between nodes in a network in the environment, and other factors. Indeed, in some cases, an adversary may intentionally inject noise into an environment to prevent network nodes from communicating with one another. Alternatively or additionally, power may be reduced to lower the risk of a signal being detected. Thus, some network environments are more permissive than other network environments, meaning that communications in a permissive environment can be transmitted at higher bit rates and with more consistency than communications in more contested environments.

Networking in contested environments is different than networking in permissive environments. One of the major differences is that there can be a much larger variation in the raw communication link rates between permissive and contested situations. For example, platforms in a permissive environment may be able to send over 1 Mbps between neighbors, while those in significant jamming conditions may be only able to send several kbps in the same network.

Traditional network management protocols typically make simplifying assumptions with regards to the physical layer, and require a certain minimum amount of bandwidth for network overhead, for example 100 kbps. When the physical layer conditions are good, and the link data rates are 1 Mbps, this results in 10% overhead. However, when the link conditions degrade to 100 kbps, the network management overhead rises to 100% of the available bandwidth leaving nothing for the intended user data traffic.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method which includes transmitting data on a communication link, in an environment. A network control overhead portion of the data is allocated to network control overhead data packets for controlling how data is transmitted on the communication link. Such overhead data packets may affect, for example, how links, routes, and/or network topologies are managed. A user data portion of the data is allocated to user data packets for transmitting data between users of nodes on the communication link. A change in data capacity of the communication link is identified. As a result, a change is made in the network control overhead portion of the data, changing at least one of frequency of network control overhead data packets or size of network control overhead data packets to attempt to maintain a predetermined proportion factor for the network control overhead portion as compared to the user data portion. The network control overhead portion of the data is transmitted according to the change.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
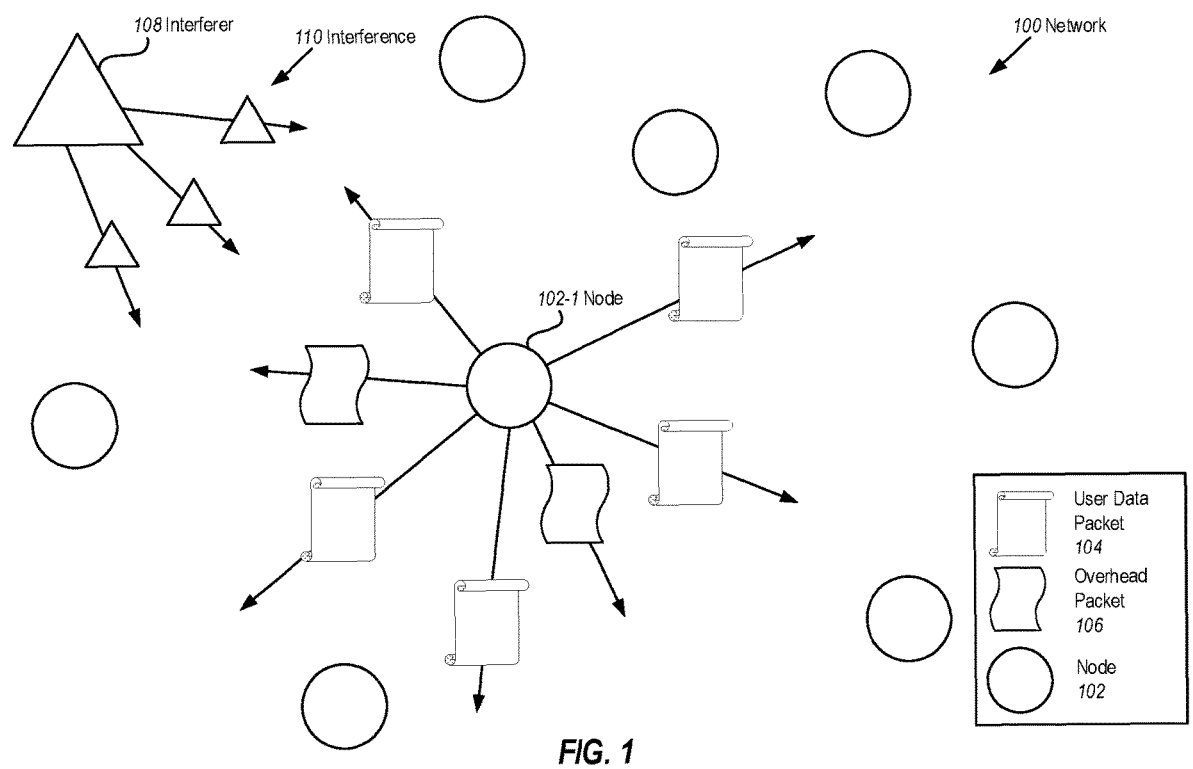
FIG. 1 illustrates nodes transmitting in a network.

Embodiments illustrated herein are able to detect when there are changes to the network environment resulting in changes to the proportion of user data to overhead data, and can as a result adjust the proportion of overhead data as compared to user data to attempt to maintain some predetermined proportion of user data to overhead data. Overhead data is data such as network control data that controls how user data is sent between nodes in the network. Such overhead data packets may affect, for example, how links, routes, or network topologies are managed. User data is the data sent between users of various nodes in the network. Thus, network control data controls how the user data is sent in the network.

As noted previously, often network control data is a predetermined set of data that is sent without regard to bit rates available or possible in a networking environment. This can result in the overhead data using up all of the available data bandwidth in a contested environment such that no user data is able to be transmitted. Thus, embodiments illustrated herein can determine characteristics of the user environment, and can adjust overhead data to ensure that bandwidth continues to exist for user data. This can be accomplished in a number of different fashions. For example, in some embodiments overhead data can be sent less often. For example, overhead messages may be sent every second for low bandwidth, contested environments, or every ¹/₁₀ second for high bandwidth uncontested (or less contested) environments Alternatively or additionally, packets containing overhead data can be made smaller. This can be accomplished by including less information in the overhead data packets. For example, data included in the overhead data packets can be have less precision when being transmitted in a contested environment as compared to a more permissive environment. Alternatively or additionally, embodiments may exclude data in overhead data packets that can be deduced from other data. For example, there may be data included in overhead data that defines certain communication characteristics for various nodes in the network. In some embodiments, overhead data may be transmitted for less than all of the nodes in the network when the overhead data for certain nodes can be used to deduce or construct overhead data for other nodes. Thus, in some embodiments, overhead data may be sent for some nodes, and that overhead data may be used to deduce overhead data for other nodes. This would reduce the amount of data necessary to be sent as overhead data. Note that this may require additional computation at various nodes in the network, and thus if there is no need to reduce the amount of overhead data, then the overhead data could be transmitted for all of the appropriate nodes in the network.

Alternatively, or additionally, with respect to precision, in some embodiments less precise information can be sent as overhead data without significantly compromising the overall precision of the system. In particular, less precision can be used for the various nodes, but combinations of less precise data can be used to deduce or compute more precise data thus reducing the effects of sending lower precision data. However, it should also be noted that in some embodiments, the network may simply have to accommodate less precise data used by nodes in a more contested network environment.

An example of a parameter that may be less precise in overhead data is signal-to-noise (SNR) ratio data. In particular, when nodes in the network receive data from other nodes, those receiving nodes will often respond with a message indicating the signal-to-noise ratio of the data received by the receiving node. Thus, the nodes sending the user data can adjust data rates, power, or other factors to cause data to be sent such that is received at a certain signal-to-noise ratio by a receiving node.

Embodiments illustrated herein implement a scalable network overhead where the network is designed to accommodate this high dynamic range of available bandwidth, while maintaining a low total overhead regardless of the raw data rate. To accomplish this, the network protocols are designed to have scalable overhead. When link rates are reduced, correspondingly lower overhead is implemented in the network.

Embodiments may implement an improved network system that ensures that the network overhead scales to an acceptable level in various different conditions, including conditions where communications are difficult, to keep the network operational and maximize useable bandwidth, despite a physical layer that can vary by many orders of magnitude in its supported data rate.

Referring now to FIG. 1, an example is illustrated. FIG. 1 illustrates a network 100. In the example illustrated in FIG. 1, the network 100 is a mesh network including a plurality of network nodes illustrated generally at 102 with a particular node illustrated at 102-1. The nodes 102 in the mesh network 100 include elements to allow the nodes 102 to communicate with one another. For example, the nodes 102 may include transmitter hardware and/or receiver hardware, as well as potentially various firmware and software. Transmitter hardware may include elements such as filters, amplifiers, modulators, power supplies, antennas, transmission lines, etc. Similarly, receiving hardware in the nodes 102 may include antennas for receiving signals, filters, demodulators, amplifiers, transmission lines, and various other hardware and/or other components for receiving data, demodulating the data, and recovering data transmitted from various nodes.

As illustrated in FIG. 1, nodes transmit various different kinds of data packets. For example, the node 102-1 is shown as transmitting user data packets generally illustrated at 104 and overhead packets generally illustrated at 106. While only the node 102-1 is shown transmitting these various packets, it should be appreciated that packets may be transmitted by any node in the network 100 including appropriate hardware and/or other components to transmit data from the node. Additionally, it should be appreciated that the node 102-1 may be configured to receive data from other nodes in the network 100 by virtue of the node 102-1 having various elements of receiver hardware and/or other components.

As noted previously, user data packets 104 include data to be transmitted between users on the various nodes 102 of the network 100. For example, applications on the various nodes 102 may send data to other applications on other nodes in the network 100.

To ensure proper network functionality, the various nodes 102 in the network 100 also transmit overhead packets 106. The overhead packets 106 include information usable to facilitate transmitting the user data packets 104. For example, an overhead packet 106 sent by a node may include information such as power and rate control data. For example, a node may send information describing the signal-to-noise ratio for data received by the node. This information can be used to determine whether data should be transmitted with different power and/or different data rates. For example, if the node 102-1 receives a signal from another node in the network 100, the node 102-1 can send an overhead packet indicating that the data was received with a particular signal-to-noise ratio. As there is a target signal-to-noise ratio at which data should be received by the node 102-1, if the data is not received at or near the target rate, then the transmitting node may need to adjust the power and/or data rate at which user data packets are sent to the node 102-1. In particular, increasing the power at which user data packets are sent will increase the signal-to-noise ratio of user data packets received by the node 102-1. Conversely, if the signal-to-noise ratio exceeds a target signal-to-noise ratio, the transmitting node may wish to reduce the power at which user data packets are sent to the node 102-1. In particular, it is often desirable that power be limited in the network 100 to prevent communications by nodes 102 in the network from being detected by adversarial entities in an environment in which the network 100 is being implemented. The signals can be sent with sufficient power to allow an adversarial entity to detect the signals such that the adversarial entity may be able to detect one or more of: presence of signals, location of entities sending signals, and potentially even be able to intercept the data in the signals. In an electronic warfare environment this can be deadly to users at the various nodes 102 of the network 100. Thus, if there is an opportunity to reduce the power of data being transmitted between the nodes 102 and the network 100, this opportunity may be exploited to maintain covertness of the various nodes in the network 100.

With respect to rate control, if the signal-to-noise ratio indicated in the overhead packets from the node 102-1 exceeds a target to signal-to-noise ratio, then it is possible to increase the data rate of communications to the node 102-1 such that additional data can be transmitted between the various nodes in the network 100 without causing the signal-to-noise ratio to be below some threshold preventing communications from being effectively transmitted. Conversely, if the signal-to-noise ratio is below some predetermined threshold, this information can be provided in the overhead packets 106 such that the various nodes in the network 100 can reduce data rates for user data packets 104 being sent to the node 102-1, resulting in an increased signal-to-noise ratio to allow the communications to be recovered by the node 102-1.

Note that typically the power and rate control information provided in overhead packets 106 is often provided on a per node basis. Thus, for example, if the node 102-1 receives a user data packet from another node the node 102-1 will send an overhead packet to the other node indicating the signal-to-noise ratio for the packet received by the node 102-1. The other node can adjust how user data packets 104 are sent to the node 102-1 as a result of receiving an overhead packet indicating the signal-to-noise ratio for packets sent from the other node to the node 102-1.

Another type of overhead data that can be sent in the overhead packets 106 is topology messages. Topology messages include information describing the various nodes in the network 100, and can include information such as location of the nodes, transmitting capabilities of the nodes, receiving capabilities of the nodes, priority levels for the nodes, etc.

Other network control data that may be included in overhead packets 106 includes routing control and/or data forwarding control. For example, overhead packets can indicate how user data packets 104 should be treated by various nodes in the network 100. For example, an overhead packet may indicate that a particular node should always forward user data packets a particular number of times. For example, various user data packets may have a particular time to live, where that time to live is based on a number of node hops in the network 100. Thus, for example a particular user data packet may have a time to live of '3', which would allow the user data packet to be forwarded three times by nodes in the network 100. The user data packet 104 could have a flag in the packet indicating the number of times that it had been forwarded. The number of times that packets are to be forwarded could be included in overhead packets transmitted to the various nodes 102 in the network 100 which could then use the counter information in the user data packets 104 to ensure that packets are forwarded appropriately.

As noted previously, the network 100 may experience interference which reduces the amount of total data that can be transmitted between the various nodes in the network 100. This is illustrated in FIG. 1 by the presence of an interferer 108 which introduces interference 110 into the network 100. Often, the interferer is an adversary attempting to jam communication signals. For example, the interference 110 may increase the noise floor in the network 100 which reduces the amount of network data that can be sent between the various nodes 102 and the network 100. Indeed, as discussed above, the network bandwidth may be degraded so severely, that ordinarily only overhead packets 106 would be able to be transmitted in the network 100. That is, previous systems caused the overhead packets 106 to be transmitted without regard to external conditions existing in the network 100. Rather, the overhead packets 106 would be sent without feedback. In contrast, embodiments illustrated herein can detect the additional interference 110 and reduce the amount of data used for the overhead packets 106 to allow user data packets 104 to be transmitted between the nodes 102 in the network 100.

For example, in some embodiments, nodes in the network 100 may be able to detect an increase in the noise floor caused by the introduction of interference 110 into the network 100. If a particular node and/or set of nodes detects this additional interference 110, the nodes can coordinate to determine that reduced amounts of data should be used in transmitting the overhead packets 106.

Alternatively or additionally, a transmitting node will always know the data rate at which it is operating. Consequently the overhead ratio is known before transmission. The transmitting node can automatically reduce the amount of data used for overhead packets 106.

Alternatively or additionally, some embodiments may allow nodes in the network 100 to act independently when detecting increased interference 110 (which is usually manifested as a reduced SNR measurement, where the SNR is the signal to noise ratio such that a node detecting increased interference can automatically reduce the amount of data used for overhead packets 106).

Alternatively or additionally, nodes in the network 100 may be able to determine the percentage of data received in user data packets as compared to the amount of data received in overhead packets 106. If the amount of data in the user data packets 104 goes below some predetermined threshold as compared to the data in the overhead packets 106, those nodes may determine that an inordinate amount of data is being used for overhead packets and can therefore cause a reduction in the amount of data used for the overhead packets 106. As with embodiments described above, this may be implemented on a node by node basis where given nodes self-determine to reduce data in overhead packets and/or alternatively the nodes 102 in the network 100 may coordinate with one another to work as a group to reduce the amount of data used in the overhead packets 106.

Reducing data in the overhead packets 106 can be accomplished in a number of different fashions. For example, in some embodiments, the packets frequency of overhead packets 106 being sent in the network 100 can be reduced. That is, if overhead packets 106 are typically sent at some periodic or quasi-periodic interval, that interval can be increased such that overhead packets 106 are not sent as often to attempt to maintain a predetermined threshold amount of data in the user data packets 104 as compared to data in overhead packets 106. In this case, the nodes 102 and the network will simply not have current data as prior to the adjustment in overhead packet frequency intervals. The various nodes will need to respond accordingly with respect to decision-making processes. For example, the nodes may experience reduced decision-making processes at the nodes.

Alternatively or additionally, the amount of data in the various overhead packets 106 may be reduced. This can be accomplished in a number of different ways. For example, in some embodiments network wide metrics can be reduced for overhead packets 106. Instead, more targeted metrics may be included in the overhead packets, such as metrics for particular nodes of particular relevance. For example, certain nodes that are particularly important as a result of being used by certain users, certain processes, etc., may have data about those nodes included in the overhead packets 106, while data about other nodes that are less important may not have network metrics for them included in the overhead packets 106.

In alternative or additional embodiments, the size of data in the overhead packets themselves can be reduced by optimizing data in the overhead packets 106. For example, nonessential data can be identified and removed from the overhead packets 106.

In alternative or additional embodiments, the size of the overhead packets can be reduced by eliminating data from the overhead packets that can be computed or just deduced from other data.

In alternative or additional embodiments, the size of the overhead packets can be reduced by reducing the precision of data in the packets. For example, some embodiments may be reduced from a precision requiring 1028 bits to a precision requiring 64 bits.

In alternative or additional embodiments, the size of the overhead packets can be reduced by changing the format of data. For example, often, control data can be provided in either a normal format or a verbose format. Normal format provides some basic information while verbose formats include additional data that may be useful in some limited circumstances but is often less or not useful under ordinary circumstances. Thus, if there is a determination that the amount of data in the overhead packets 106 should be reduced, and packets are being transmitted in a verbose format, embodiments can cause the overhead packets 106 to be transmitted from the various nodes in a normal format instead to reduce the amount of data in the overhead packets 106.

Additionally or alternatively, the overhead packets 106 may include information describing capabilities of a node sending a particular overhead packet and/or capabilities of neighbor nodes about with which the nodes have information.

Figure 2:
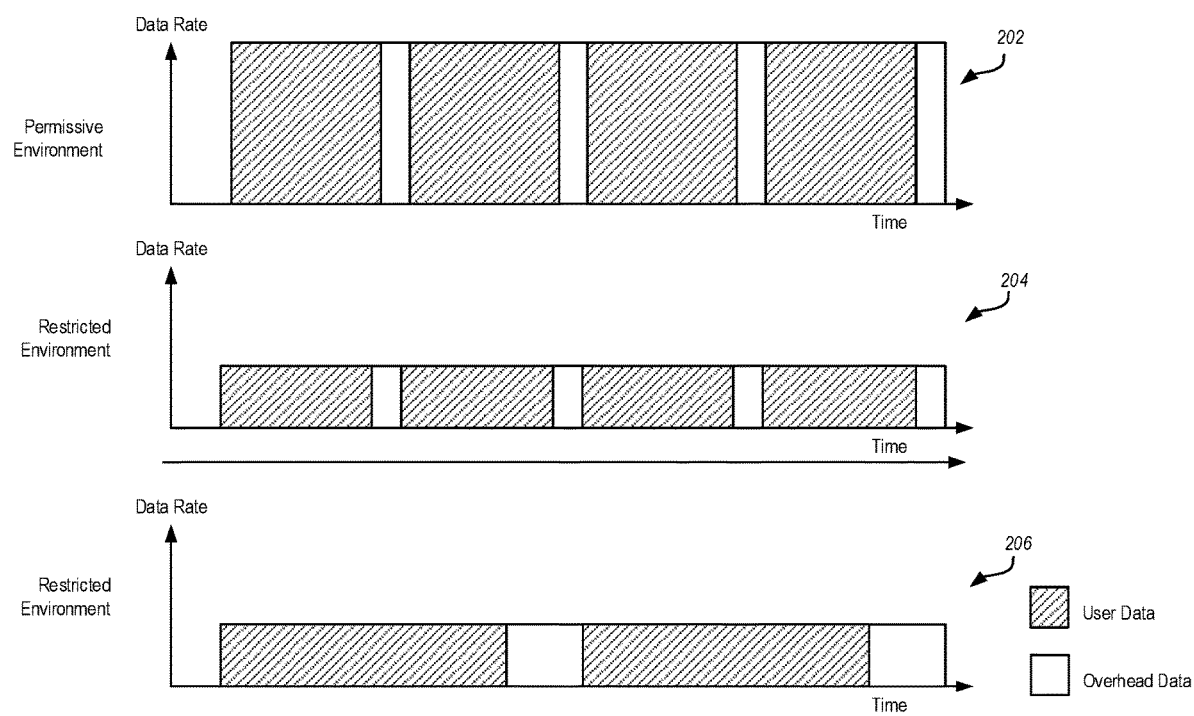
FIG. 2 illustrates the difference between transmission of overhead packets in a permissive environment as opposed to transmission of overhead packets in a restricted environment.

Referring now to FIG. 2, three example graphs are illustrated comparing data packets in a permissive environment versus data packets in a restricted environment. FIG. 2 illustrates that in the permissive environment more information may be sent more often in overhead data packets as illustrated in the graph 202. In contrast, in restricted environments, less information is sent as illustrated at 204 with the same frequency as in a permissive environment, or the same amount of information is sent less often as illustrated at 206 than in a permissive environment. Note that while FIG. 2 illustrates that either less information is sent just as often or the same information is sent less often, it should be appreciated that different combinations of amount and frequency of data can be used as appropriate. For example, some embodiments may reduce only the frequency that overhead packets are sent (as illustrated at 206). In contrast, other embodiments may reduce only the size of the individual packets being sent (as illustrated at 204). In some embodiments, both size and frequency of data packets being sent may be reduced. In still other embodiments, the size of the data packets may be reduced, but the frequency may be increased while still decreasing overall bandwidth used by the overhead packets. Alternatively, the size of the data packets may be increased, but the frequency reduced while still decreasing overall bandwidth used by the overhead packets.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
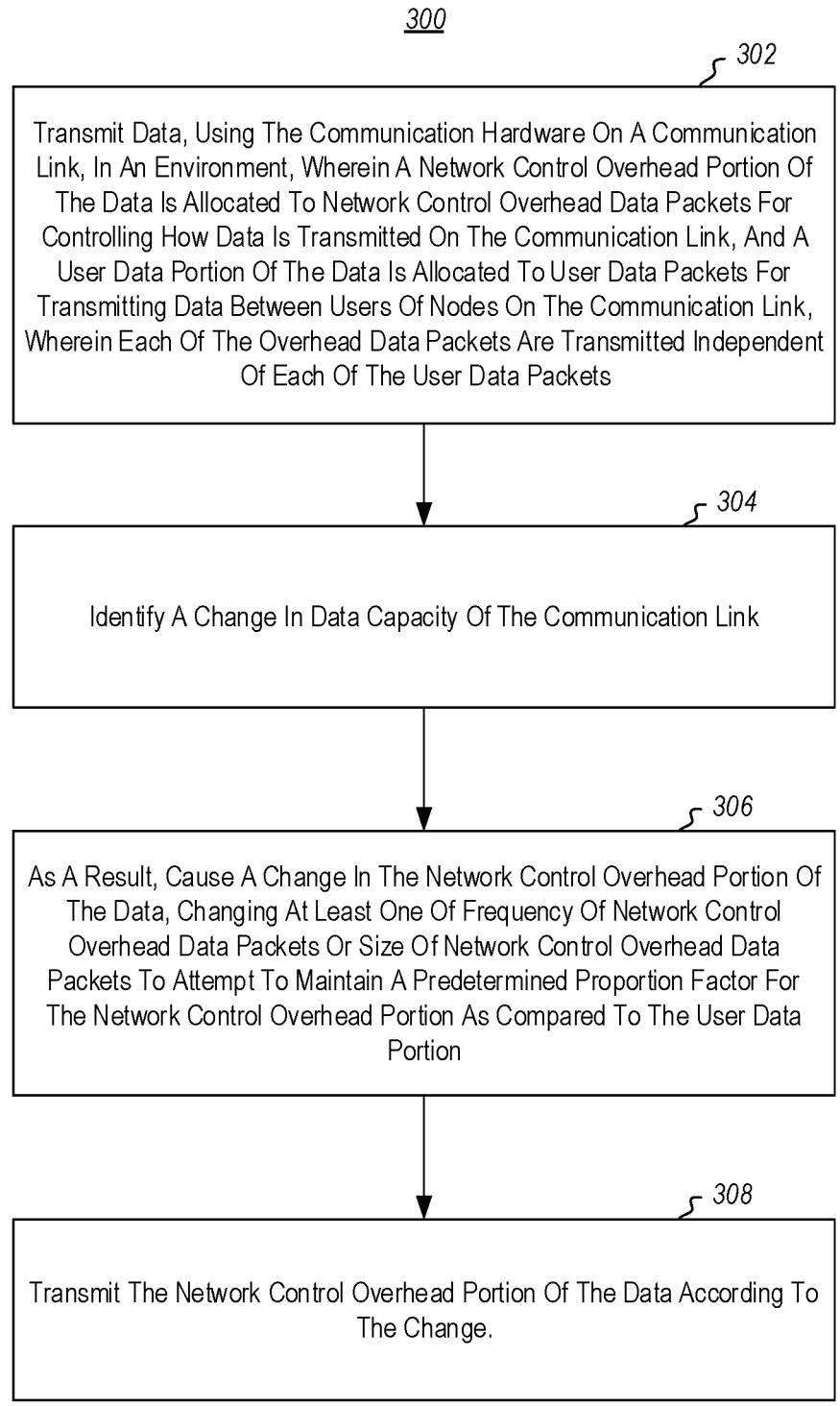
FIG. 3 illustrates a method of transmitting data.

Referring now to FIG. 3, a method 300 is illustrated. The method 300 includes acts for sending network data. The method 300 includes transmitting data on a communication link, in an environment, wherein a network control overhead portion of the data is allocated to network control overhead data packets for controlling how data is transmitted on the communication link, and a user data portion of the data is allocated to user data packets for transmitting data between users of nodes on the communication link, wherein each of the overhead data packets is transmitted independent of each of the user data packets (act 302).

The method 300 further includes identifying a change in data capacity of the communication link (act 304).

The method 300 further includes as a result, causing a change in the network control overhead portion of the data, changing at least one of frequency of network control overhead data packets or size of network control overhead data packets to attempt to maintain a predetermined proportion factor for the network control overhead portion as compared to the user data portion (act 306). For example, embodiments may change how network control overhead data is sent to attempt to have a certain, predetermined percentage of the transmitted data be network control overhead data. Alternatively or additionally, embodiments may attempt to maintain a predetermined number of overhead packets as compared to user data packets.

The method 300 further includes transmitting the network control overhead portion of the data according to the change (act 308).

The method 300 may be practiced where causing a change in the network control overhead portion of the data comprises attempting to maintain the proportion factor for the network control overhead portion and the user data portion. (e.g., could be below 20%).

The method 300 may be practiced where identifying a change in data capacity of the communication link comprises detecting an environmental change causing at least one of a temporal change or a spectral change in the communication link.

For example, a temporal change may include detecting a power jump in noise. A histogram is used to determine if the power jump is related to degradation of the communication environment, and in some embodiments, in particular to detect jamming signals.

With respect to spectral sensing, embodiments may include hardware to perform spectrum analysis, such as through the use of fast Fourier transforms (FFT) of signals to determine the various frequencies in a signal. Pattern recognition may be used to recognize less permissive environments, and in particular to detect jamming signals.

The method 300 may be practiced where identifying a change in data capacity of the communication link comprises detecting at least one of a temporal change in the communication link or a spectral change in the communication link.

The method 300 may be practiced where causing a change in the network control overhead portion of the data causes control packets to be sent to a different number of neighbors in the environment.

The method 300 may be practiced where causing a change in the network control overhead portion of the data causes control packets to be sent to neighbors in the environment in a multiplexed fashion. For example, packets can be sent for certain neighbors in a round robin fashion, time division multiplexed fashion, random fashion, priority fashion, manually defined fashion, etc. That is, a "turn-taking" scheme is implemented for sending messages intended for the various neighbor nodes.

The method 300 may be practiced where causing a change in the network control overhead portion of the data causes sent overhead data to have reduced precision from previously sent overhead data.

The method 300 may be practiced where causing a change in the network control overhead portion of the data causes network nodes to exhibit more decision making autonomy than prior to the change in the network control overhead portion of the data.

Figure 4:
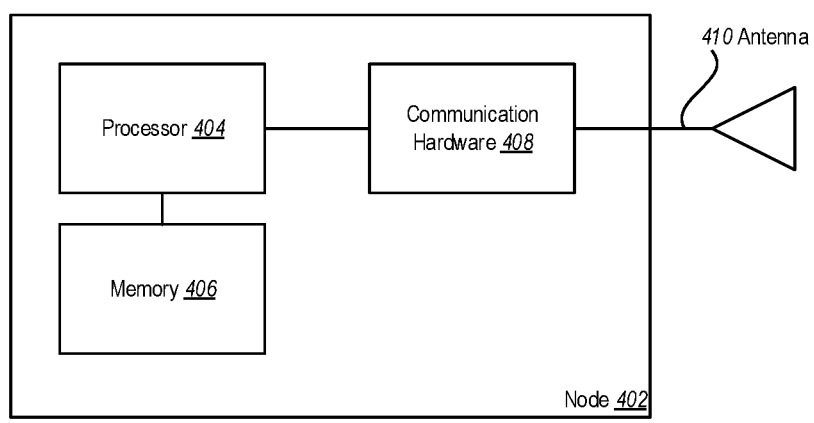
FIG. 4 illustrates a node for transmitting data.

Further, with reference now to FIG. 4, the methods may be practiced by a computer system, such as a node 402, including one or more processors 404 and computer-readable media 406 such as computer memory. In particular, the computer memory may store computer-executable instructions that when executed by one or more processors cause various functions to be performed, such as the acts recited in the embodiments.

In particular, the processor can control communication hardware 408 which transmits data on the antenna 410 to other nodes to perform the various functions illustrated herein.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of sending network data, the method comprising:
   transmitting data on a communication link, in an environment, wherein a network control overhead portion of the data is allocated to network control overhead data packets for controlling how data is transmitted on the communication link, and a user data portion of the data is allocated to user data packets for transmitting data between users of nodes on the communication link, wherein each of the overhead data packets are transmitted independent of each of the user data packets;

identifying a change in data capacity of the communication link;

as a result, causing a change in the network control overhead portion of the data, changing at least one of frequency of network control overhead data packets or size of network control overhead data packets to attempt to maintain a predetermined proportion factor for the network control overhead portion as compared to the user data portion; and transmitting the network control overhead portion of the data according to the change.

2. The method of claim 1, wherein identifying a change in data capacity of the communication link comprises detecting an environmental change causing at least one of a temporal change or a spectral change in the communication link.

3. The method of claim 1, wherein identifying a change in data capacity of the communication link comprises detecting at least one of a temporal change in the communication link or a spectral change in the communication link.

4. The method of claim 1, wherein causing a change in the network control overhead portion of the data causes control packets to be sent to a different number of neighbors in the environment.

5. The method of claim 1, wherein causing a change in the network control overhead portion of the data causes sent overhead data to have reduced precision from previously sent overhead data.

6. The method of claim 1, wherein causing a change in the network control overhead portion of the data causes network nodes to exhibit more decision making autonomy than prior to the change in the network control overhead portion of the data.

7. The method of claim 1, wherein changing the size of network control overhead data packets comprises removing nonessential data from the network control overhead portion of the data.

8. A system comprising:
communication hardware;
one or more processors coupled to the communication hardware; and
one or more computer-readable media having stored thereon instructions that are executable by the one or more processors to configure the system to send network data, including instructions that are executable to configure the system to perform at least the following:
transmit data, using the communication hardware on a communication link in an environment, wherein a network control overhead portion of the data is allocated to network control overhead data packets for controlling how data is transmitted on the communication link, and a user data portion of the data is allocated to user data packets for transmitting data between users of nodes on the communication link, wherein each of the overhead data packets are transmitted independent of each of the user data packets;
identify a change in data capacity of the communication link;
as a result, cause a change in the network control overhead portion of the data, changing at least one of frequency of network control overhead data packets or size of network control overhead data packets to attempt to maintain a predetermined proportion factor for the network control overhead portion as compared to the user data portion;

and
transmit the network control overhead portion of the data according to the change.

9. The system of claim 8, wherein identifying a change in data capacity of the communication link comprises detecting an environmental change causing at least one of a temporal change or a spectral change in the communication link.

10. The system of claim 8, wherein identifying a change in data capacity of the communication link comprises detecting at least one of a temporal change in the communication link or a spectral change in the communication link.

11. The system of claim 8, wherein causing a change in the network control overhead portion of the data causes control packets to be sent to a different number of neighbors in the environment.

12. The system of claim 8, wherein causing a change in the network control overhead portion of the data causes sent overhead data to have reduced precision from previously sent overhead data.

13. The system of claim 8, wherein causing a change in the network control overhead portion of the data causes network nodes to exhibit more decision making autonomy than prior to the change in the network control overhead portion of the data.

14. The system of claim 8, wherein changing the size of network control overhead data packets comprises removing nonessential data from the network control overhead portion of the data.

15. A physical computer-readable storage media having stored thereon instructions that are executable by one or more processors to configure a computer system to send network data, including instructions that are executable to configure the computer system to perform at least the following:
transmit data, using the communication hardware on a communication link, in an environment, wherein a network control overhead portion of the data is allocated to network control overhead data packets for controlling how data is transmitted on the communication link, and a user data portion of the data is allocated to user data packets for transmitting data between users of nodes on the communication link, wherein each of the overhead data packets are transmitted independent of each of the user data packets;
identify a change in data capacity of the communication link;
as a result, cause a change in the network control overhead portion of the data, changing at least one of frequency of network control overhead data packets or size of network control overhead data packets to attempt to maintain a predetermined proportion factor for the network control overhead portion as compared to the user data portion; and
transmit the network control overhead portion of the data according to the change.

16. The physical computer readable storage media of claim 15, wherein identifying a change in data capacity of the communication link comprises detecting an environmental change causing at least one of a temporal change or a spectral change in the communication link.

17. The physical computer readable storage media of claim 15, wherein identifying a change in data capacity of the communication link comprises detecting at least one of a temporal change in the communication link or a spectral change in the communication link.

18. The physical computer readable storage media of claim 15, wherein causing a change in the network control overhead portion of the data causes control packets to be sent to a different number of neighbors in the environment.

19. The physical computer readable storage media of claim 15, wherein causing a change in the network control overhead portion of the data causes sent overhead data to have reduced precision from previously sent overhead data.

20. The physical computer readable storage media of claim 15, wherein causing a change in the network control overhead portion of the data causes network nodes to exhibit more decision making autonomy than prior to the change in the network control overhead portion of the data.

21. The physical computer readable storage media of claim 15, wherein changing the size of network control overhead data packets comprises removing nonessential data from the network control overhead portion of the data.

\* \* \* \* \*